April 13, 1937.  O. C. BUMPAS ET AL  2,077,307
TERRACE OUTLET
Filed Oct. 21, 1935   3 Sheets-Sheet 1
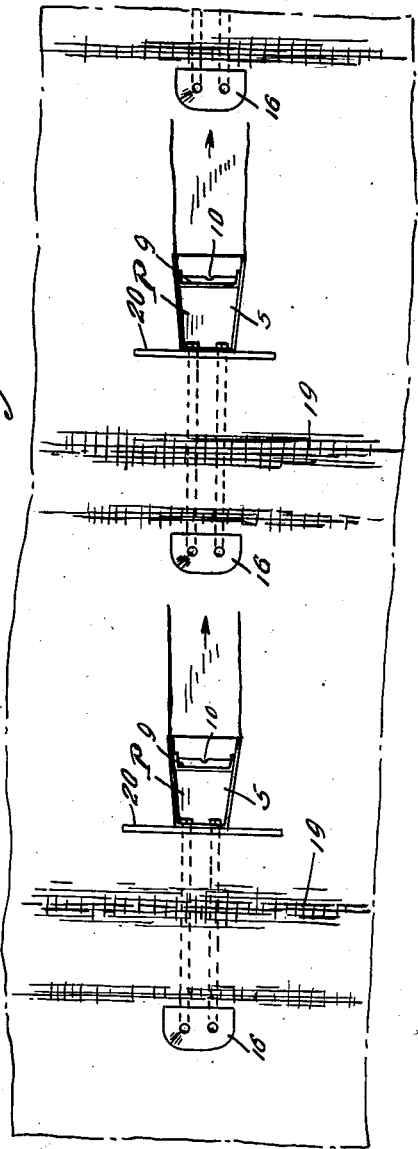
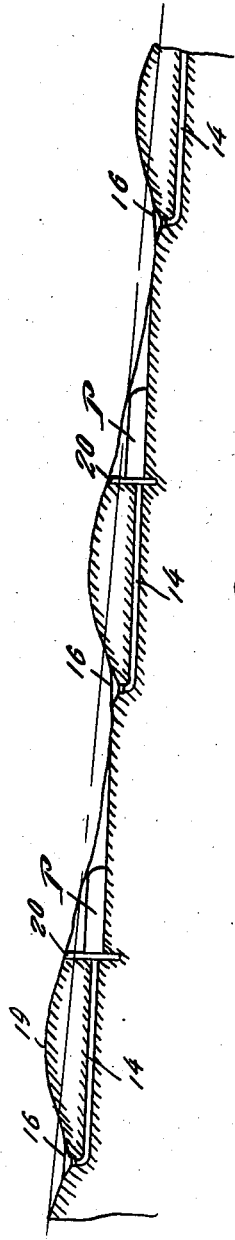
Inventors
O. C. Bumpas
W. J. Mills
By Clarence A. O'Brien
Attorney

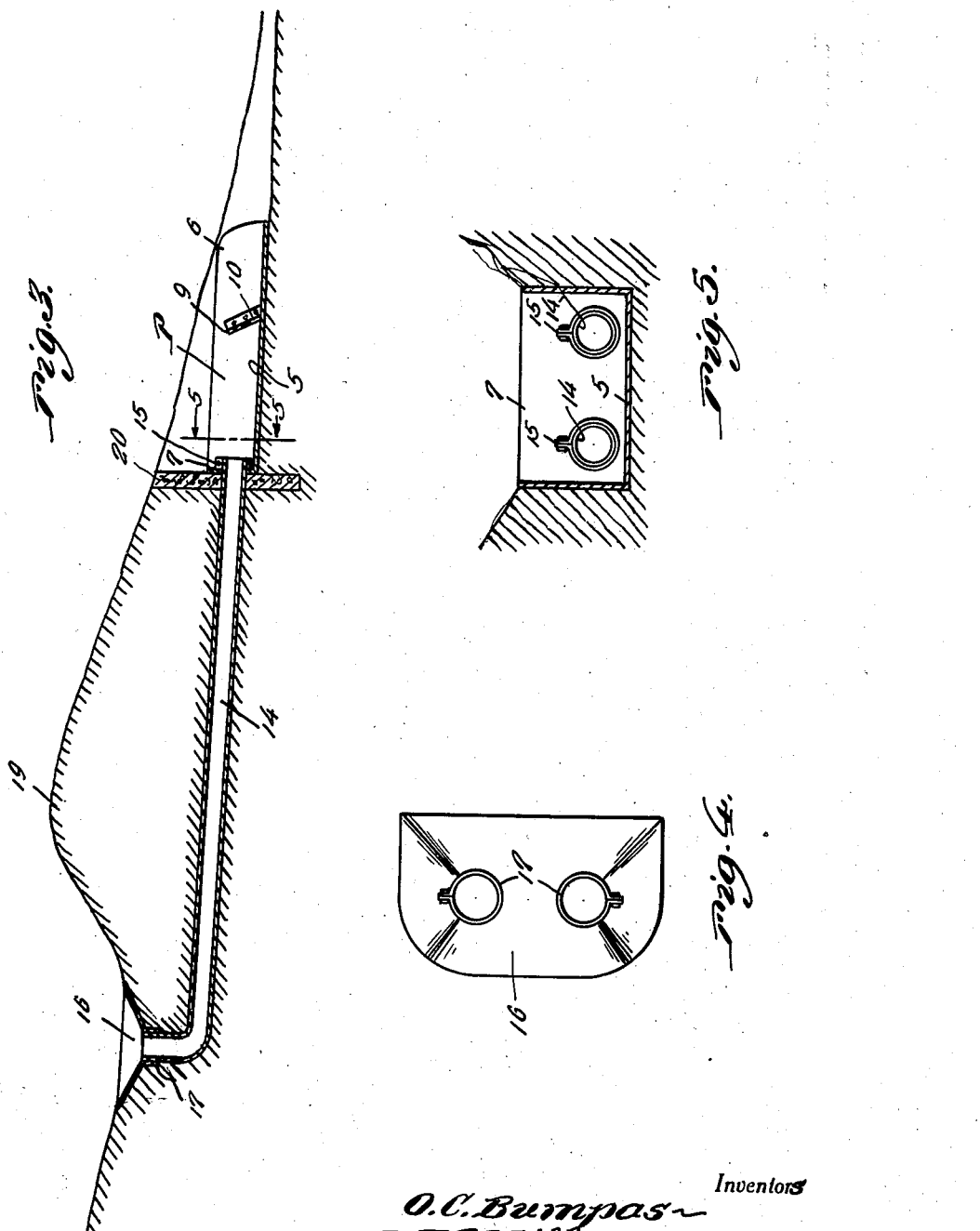

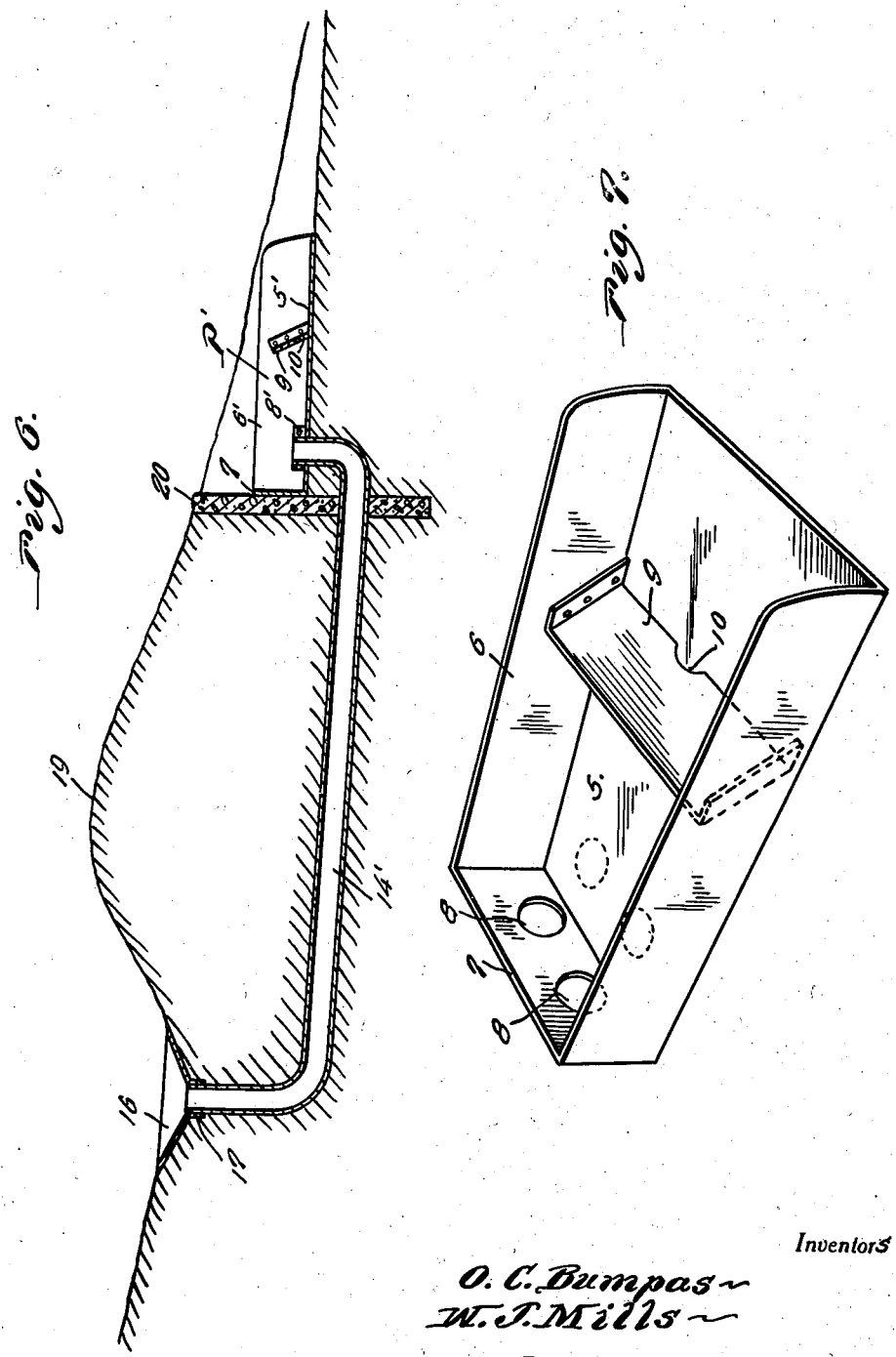

Patented Apr. 13, 1937

2,077,307

UNITED STATES PATENT OFFICE 2,077,307

TERRACE OUTLET

Orville C. Bumpas and William J. Mills, Braden, Tenn.

Application October 21, 1935, Serial No. 46,051

6 Claims. (Cl. 61—10)

The present invention relates to a terrace outlet to be used primarily in controlling the runoff of surface water from terraces constructed on agricultural land. It may, however, be used in any system of terraces where it is necessary "to let the water down" from one level to another in such a way that soil erosion will not occur.

As is well known, land terracing is the greatest means of retaining what is left of our most valuable asset, namely, fertile top soil. Terracing with uncontrolled run-off is dangerous and may cause greater damages than no terracing at all.

However, the progress of this valuable work is retarded by the absence of a practical and economical means of "letting the water down" from one terrace interval to the next in such a manner that soil erosion will not occur. Concrete, masonry or timber outlet dams as now used are costly in labor, material, time, transportation and installation. They are uneconomical because they are not flexible and adaptable. Once they are installed, they are not usable again, since removal means destruction. The water is not entirely under control in these dams, and they require a large amount of maintenance. They are bulky and they place a large obstruction in the field.

The principal object of our invention is to prevent soil erosion in an efficient and effective manner.

Another important object resides in overcoming the above enumerated disadvantages of the outlet dams as now used, by providing an apparatus which is of a comparatively simple construction and which may be installed in the ground, with a minimum amount of labor and which is thoroughly efficient and reliable in use.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of the terrace outlets.

Figure 2 is a side elevational view thereof.

Figure 3 is an enlarged detailed vertical longitudinal section through one of the outlets.

Figure 4 is a plane view of a plate for supporting the water inlets.

Figure 5 is a vertical transverse section taken substantially on the line 5—5 of Figure 3.

Figure 6 is a vertical longitudinal section showing another embodiment of the invention.

Figure 7 is a perspective view of one of the outlet boxes.

Referring to the drawings in detail, 16 denotes a plurality of water inlets, which are slightly conical in configuration and which fit into the flow-lines of the terraces below the crests 19 of said terraces. These inlets may be constructed of metal or concrete, and are designed to fit into the horizontal surface of the flow-lines of the terraces for the purpose of catching all the water and completely draining the terraces.

Constructed below the crests 19 of the terraces are conduits, into which are mounted pipes 14. Each pipe has one end thereof detachably connected to the lower portion of each inlet 16 by means of a collar 17, and has its other end entering the outlet box P through the openings 8 in the front wall 7 of said box. This last mentioned end of each pipe is secured in place by a clamp collar 15. These pipes may be made of clay, concrete, metal or other suitable material, and function to carry the water from the water inlets 16 to the outlet boxes P. Each outlet box is located below the water inlet, a vertical distance equal to the interval between the terraces, and a horizontal distance equal approximately to the width of each terrace.

Each outlet box P comprises a trapezoidal apron or bottom 5 having upstanding side walls 6 and a front wall 7 provided with the openings 12. The rear or bottom end is open. The outlet box may be constructed of metal, timber, concrete, or other suitable material, and has mounted across the intermediate portion thereof a baffle 9, which inclines forwardly and upwardly a distance not to exceed the diameter of the pipes 14. This baffle checks the velocity of the flow of water from the pipes into the outlet box P, and releases the water to flow at a low velocity into the bottom or apron 5, into the channel which carries the water to the next succeeding terrace outlet. In this manner the flow of the water is controlled to eliminate scouring in said channel. An aperture 10 is formed in the bottom end of the baffle 9 to drain the water remaining behind said baffle, thereby preventing stagnant water and breeding places for mosquitoes. Abutting the front wall 7 of each outlet box P there is disposed a retaining wall 20, which acts as a stabilizing unit and also as an abutment wall for the soil.

These terrace outlets may be arranged in series as indicated to advantage in Figures 1 and 2. It is apparent that while two pipes are herein disclosed, any desired number may be used. The number of pipes will vary directly with the amount of water to be taken care of.

In Figure 6, we have shown another embodiment of the invention wherein the pipe 14' enters through opening 8' provided in the bottom or apron 5' of the outlet box P'. Otherwise, this embodiment is the same as that first described in detail.

From the above description it is evident that our terrace outlet offers a means of complete control of run-off water from the time it enters until a place is chosen to turn it loose, at which time it is so controlled as to cause little, if any, scouring in the channel leading to the next terrace outlet. It is further evident that there is a relatively small obstruction in the field since the provision for underground pipes makes it possible to continue the terrace intact throughout its course. Accordingly, there is no interference with the use of plows and teams.

The terrace outlet embodying this invention is flexible and adaptable to any situation where land irrigation is required, and particularly adaptable to many situations in which the use of any of the dams mentioned above would be prohibitive. Our terrace outlet requires the minimum amount of labor for installation, since only an excavation large enough to receive the pipe 14 is required. Moreover, the customary form lumber and construction usually necessary in preparing for actual installation are eliminated.

The simplicity of the parts comprising the invention eliminates the problem of transportation of heavy materials and equipment. The parts are fabricated and transported directly to the job ready for installation. They may be installed without the aid of technical supervision thereby permitting the land owner to install such an outlet with farm labor. If for any reason the system is changed, the outlets may be reused.

It is thought that the construction, utility and advantages of this invention will now be quite apparent to those skilled in this art without a more detailed description thereof.

The present embodiment of the invention has been described in considerable detail merely for the purpose of exemplification, since in actual practice it attains the features of advantage enumerated as desirable in the statement of the invention and the above description.

It will be apparent that changes in the details of construction and in the combination and arrangement of parts may be resorted to without departing from the spirit or scope of the invention as hereinafter claimed or sacrificing any of its advantages.

What is claimed is:

1. A terrace outlet of the class described including, in combination, an outlet box closed at one end and open at the other end, a baffle across the outlet box having an aperture in the bottom edge thereof to provide a drain for said baffle, a pipe entering said outlet box through the closed end and terminating in a water inlet at a point in the flow line of the terrace.

2. A terrace outlet of the class described including, in combination, an outlet box closed at one end and open at the other end, a baffle across the outlet box having an aperture in the bottom edge thereof to provide a drain for said baffle, a pipe entering said outlet box through the closed end and terminating in a water inlet at a point in the flow line of the terrace, and a retaining wall adjacent the outlet box to secure said pipe in position.

3. A terrace outlet of the class described including, in combination, an outlet box closed at one end and open at the other end, a baffle across the outlet box having an aperture in the bottom edge thereof to provide a drain for said baffle, a pipe entering said outlet box through the closed end and terminating in a water inlet at a point in the flow line of the terrace, said baffle inclining upwardly toward the closed end of the outlet box.

4. A terrace outlet of the class described including, in combination, an outlet box closed at one end and open at the other end, a baffle across the outlet box having an aperture in the bottom edge thereof to provide a drain for said baffle, a pipe entering the box through the closed end and terminating in a water inlet at a point in the flow line of the terrace, said baffle extending vertically a distance less than the diameter of the pipe to permit water from said pipe to flow over said baffle.

5. A terrace outlet of the class described including, in combination, an outlet box closed at one end and open at the other, a pipe entering the box through the closed end and terminating in a water inlet at a point in the flow line of the terrace, and stationary means within said box intermediate its ends for reducing the velocity of the flow of water entering the outlet box.

6. An article of manufacture to be used in connection with a terrace outlet, comprising an outlet box having apertures at one end and entirely open at the other, and a baffle positioned across the outlet box to reduce the velocity of the flow of water entering said box, and having an aperture in the bottom edge thereof to provide a drain for said baffle.

ORVILLE C. BUMPAS.
WILLIAM J. MILLS.